United States Patent
Lakshmanamurthy et al.

(10) Patent No.: US 7,251,219 B2
(45) Date of Patent: Jul. 31, 2007

(54) METHOD AND APPARATUS TO COMMUNICATE FLOW CONTROL INFORMATION IN A DUPLEX NETWORK PROCESSOR SYSTEM

(75) Inventors: Sridhar Lakshmanamurthy, Sunnyvale, CA (US); Lawrence B. Huston, Wexford, PA (US); Yim Pun, Saratoga, CA (US); Raymond Ng, Fremont, CA (US); Hugh M. Wilkinson, III, Newton, MA (US); Mark B. Rosenbluth, Uxbridge, MA (US); David Romano, Cumberland, RI (US)

(73) Assignee: Intel Corporation, Santa Clara, CA (US)

(*) Notice: Subject to any disclaimer, the term of this patent is extended or adjusted under 35 U.S.C. 154(b) by 918 days.

(21) Appl. No.: 10/188,081

(22) Filed: Jul. 3, 2002

(65) Prior Publication Data

US 2004/0004961 A1    Jan. 8, 2004

(51) Int. Cl.
*H04B 1/44*    (2006.01)
(52) U.S. Cl. .................................. 370/236; 370/413
(58) Field of Classification Search ............. None
See application file for complete search history.

(56) References Cited

U.S. PATENT DOCUMENTS

| 5,612,953 A | * | 3/1997 | Olnowich ................. 370/367 |
| 6,654,373 B1 | * | 11/2003 | Maher et al. .............. 370/392 |
| 6,944,168 B2 | * | 9/2005 | Paatela et al. ............ 370/401 |
| 7,042,842 B2 | * | 5/2006 | Paul et al. ................. 370/229 |
| 2003/0058880 A1 | * | 3/2003 | Sarkinen et al. ........... 370/413 |
| 2003/0074473 A1 | * | 4/2003 | Pham et al. ............... 709/246 |
| 2003/0126297 A1 | * | 7/2003 | Olarig et al. .............. 709/250 |
| 2003/0202510 A1 | * | 10/2003 | Witkowski et al. ........ 370/386 |

* cited by examiner

*Primary Examiner*—Chau Nguyen
*Assistant Examiner*—Jung Park
(74) *Attorney, Agent, or Firm*—Grossman, Tucker, Perreault & Pfleger, PLLC

(57) ABSTRACT

In-band flow control data may be received from a switch fabric at a first network processor. The received in-band flow control data may be transmitted to a second network processor using a flow control bus. The second network processor may determine which receive queues in the switch fabric exceed a predetermined overflow threshold based on the in-band flow control data. The second processor may transmit data to the receive queues in the switch fabric determined not to exceed the predetermined overflow threshold.

8 Claims, 5 Drawing Sheets

METHOD AND APPARATUS TO COMMUNICATE FLOW CONTROL INFORMATION IN A DUPLEX NETWORK PROCESSOR SYSTEM

TECHNICAL FIELD

The present invention relates to switches. In particular, the present invention relates to data flow control between network processors.

BACKGROUND OF THE INVENTION

Line cards are often used to process data on a network line. Each line card acts as an interface between a network and a switch fabric. The line card may convert the data set from the format used by the network to a format for processing. The line card also may perform necessary processing on the data set. This processing may include further translation, encryption, error checking, and the like. After processing, the line card converts the data set into a transmission format for transmission across the switch fabric.

The line card also allows a data set to be transmitted from the switch fabric to the network. The line card receives a data set from the switch fabric, processes the data set, and then converts the data set into the network format. The network format can be asynchronous transfer mode (ATM) or a different format.

When a half-duplex processor based line card is used, two network processors are needed to achieve full duplex network communications. One network processor may be used for inbound traffic and the other network processor may be used for outgoing traffic. Inbound data traffic is typically traffic from the media to the switch fabric, while outbound traffic is typically data traffic from the switch fabric to the media. The switch fabric provides the interface between the line card and the network. Each network processor can communicate with the switch fabric in only one direction. When data buffers in either the line card and/or the switch fabric overflow, large round trip latency is introduced to communicate flow control information to the line card and/or the switch fabric to adjust the data flow.

DETAILED DESCRIPTION

Embodiments of the present invention provide a method and apparatus for handling round trip latency in a communications system that uses two half-duplex network processors for full-duplex communications. One of the half-duplex processors may be used for outgoing traffic and the other may be used for inbound traffic. In one embodiment, flow-control data may be received at one of the half-duplex processors from a switch fabric. The flow-control data may indicate the flow status of data queues in the switch fabric. The flow-control data may be transmitted to the second processor via a private flow control bus. The flow control data may be used by the second processor to temporarily suspend data transmits to switch fabric data queues determined to be congested. Once the congestion is cleared, data transmits to those switch fabric queues may resume.

Figure 1:
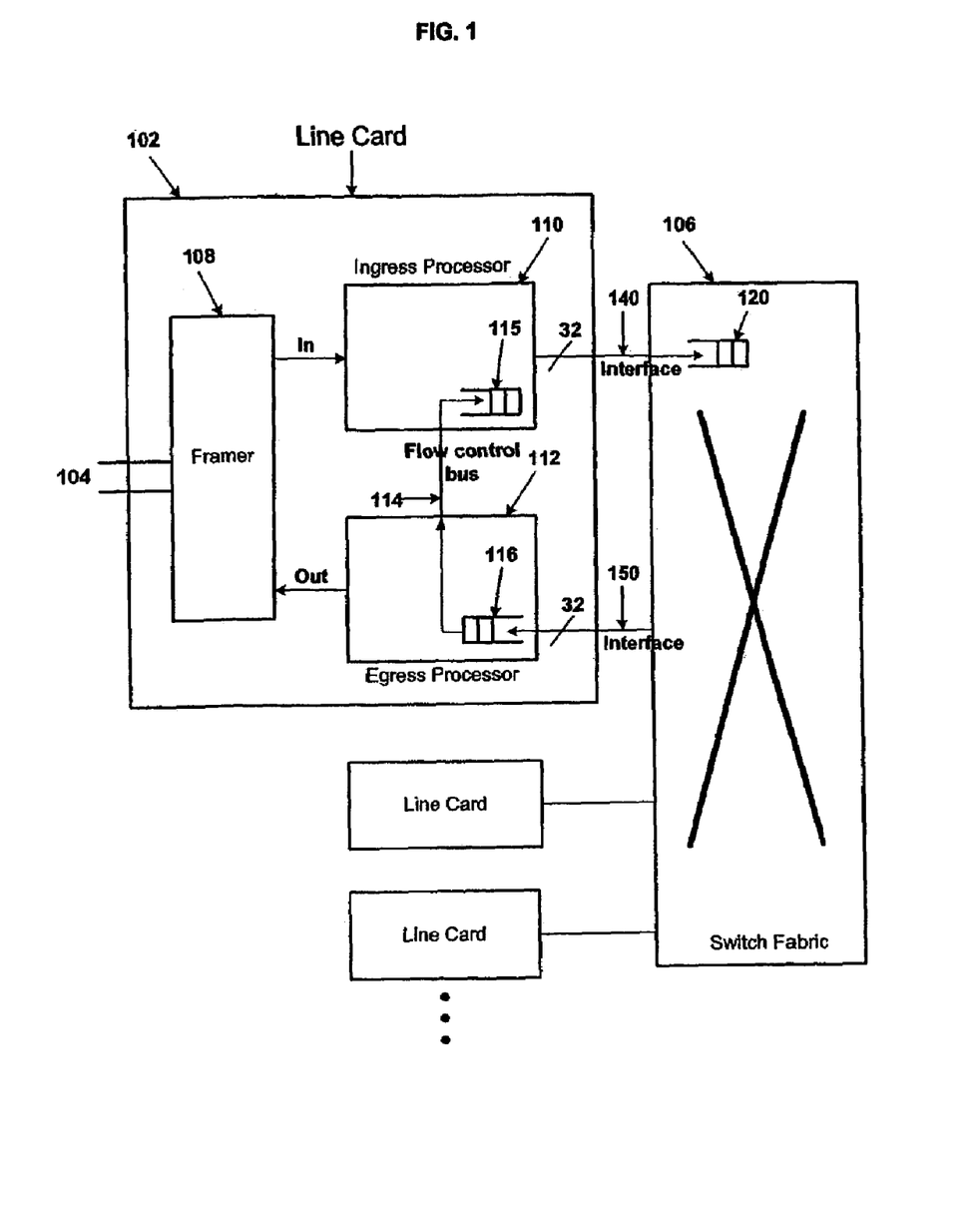
FIG. 1 is a block diagram of a partial network processing system in accordance with an embodiment of the present invention.

One embodiment of a line card 102 used to process data on a network line is illustrated in FIG. 1. Each line card acts as an interface between a network 104 and a switch fabric 106. The line card 102 receives a data set from the network 104 via a framer 108. The framer 108 converts the data set from the format used by the network, which may include segmenting the data set, to a format for processing. The converted data set is then transmitted to an ingress processor 110. The ingress processor 110 performs necessary processing on the data set before being forwarded to the switch fabric 106. This processing may include further translation, encryption, error checking, and the like. After processing, the ingress processor 110 converts the data set into a transmission format for transmission across the switch fabric 106, then transmits the data set to the switch fabric 106. The transmission format may be common switch interface (CSIX) format, or a different format. As known, the CSIX protocol allows data to be transmitted from the source to the destination in variable sized units called C-Frames.

The line card 102 also allows a data set to be transmitted from the switch fabric 106 to the network 104. An egress processor 112 receives a data set from the switch fabric 106, processes the data set, and then transmits the data set to the framer 108. The framer 108 converts the data set into the network format. The network format can be asynchronous transfer mode (ATM) or a different format.

In embodiments of the present invention, ingress processor 110 may handle traffic coming from the network 104 (inbound traffic), while egress processor may handle traffic going out to the network 104 (outbound traffic). The ingress processor 110 sends data to the switch fabric 106 via one way communications path 140. If the data buffer or queues 120 in switch fabric 106 becomes congested or overflows, the switch fabric 106 can send in-band flow control data to the egress processor 112 using the one way communications path 150. The ingress processor 110 may analyze flow control bits in the flow control data. The flow control bits may indicate which queues may be congested. Based on this analysis, the ingress processor 110 may temporarily suspend data to the congested queues.

In embodiments of the present invention, the egress processor 112 may divert the flow-control information to the ingress processor via a communications path 114. The communications path may be, for example, a four (4) bit data bus or other type of communications bus. The ingress processor 110 may receive the flow control information and process the information to temporarily suspend data transmissions to the data buffer 120 and/or to control the rate at which data is being sent to the data buffer 120. In embodiments of the present invention, a transmit scheduler may process the flow control data to maintain line rate performance.

In embodiments of the present invention, the communication path 140 may also be used to send in-band flow control signaling from the ingress processor 110 to the switch fabric 106. The flow control signaling may identify queues in the data buffer 116, of the egress processor 112, that are congested. In response, the switch fabric 106 may adjust the transmission data rate and/or temporarily suspend data transmissions to the identified queues.

Figure 2:
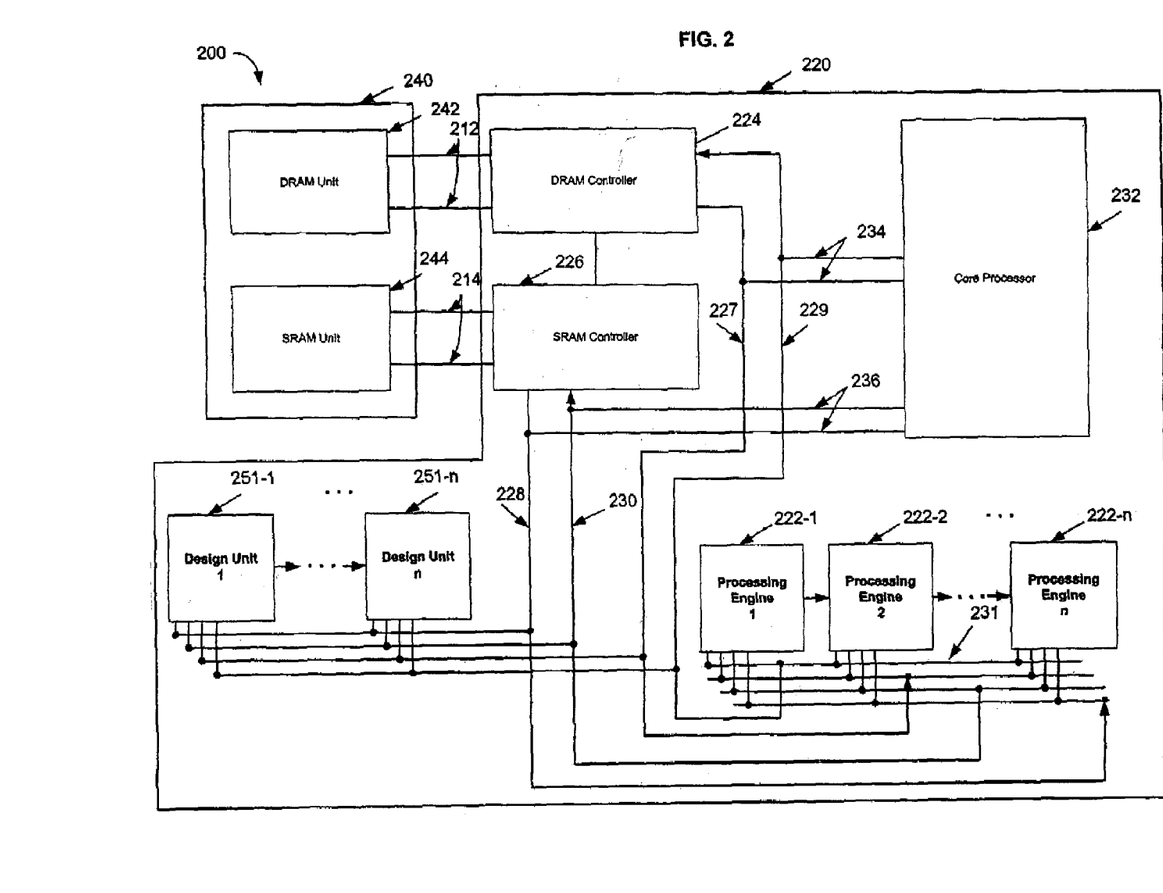
FIG. 2 is a block diagram of a network line card in accordance with an embodiment of the present invention.

FIG. 2 is a block diagram of a processing system that can be used as ingress processor 110 and/or egress processor 112, in accordance with an embodiment of the present invention. In FIG. 2, a computer processor system 200 may include a parallel, hardware-based multithreaded network processor 220 coupled by a pair of memory buses 212, 214 to a memory system or memory resource 240. Memory system 240 may include a dynamic random access memory (DRAM) unit 242 and a static random access memory (SRAM) unit 244. The processor system 200 may be especially useful for tasks that can be broken into parallel subtasks or functions. Specifically, hardware-based multithreaded processor 220 may be useful for tasks that are bandwidth oriented rather than latency oriented. Hardware-based multithreaded processor 220 may have multiple micro-engines or processing engines 222-1–222-n each with multiple hardware controlled threads that may be simultaneously active and independently work on a specific task.

Processing engines 222-1–222-n each may maintain program counters in hardware and states associated with the program counters. Effectively, corresponding sets of context or threads can be simultaneously active on each of processing engines 222-1–222-n while only one thread per processing engine may be actually operating at any one time. Processing engines 222 may be coupled to each other via next neighbor busses 231.

In FIG. 2, in accordance with an embodiment of the present invention, eight processing engines 222-1–222-n, where n=8, may be implemented with each processing engine 222-1–222-1-n having capabilities for processing eight hardware threads or contexts. The eight processing engines 222-1–222-n may operate with shared resources including memory resource 240 and bus interfaces. The hardware-based multithreaded processor 220 may include a dynamic random access memory (DRAM) controller 224 and a static random access memory (SRAM) controller 226. DRAM unit 242 and DRAM controller 224 may be used for processing large volumes of data, for example, processing of network payloads from network packets. SRAM unit 244 and SRAM controller 226 may be used in a networking implementation for low latency, fast access tasks, for example, accessing look-up tables, core processor memory, and the like.

In accordance with an embodiment of the present invention, push buses 227, 228 and pull buses 229, 230 may be used to transfer data between processing engines 222-1–222-n and DRAM unit 242 and SRAM unit 244. In particular, push buses 227, 228 may be unidirectional buses that move the data from memory resource 40 to processing engines 222-1–222-n whereas pull buses 229, 230 may move data from processing engines 222-1–222-n to their associated DRAM unit 242 and SRAM unit 244 in memory resource 240.

In accordance with an embodiment of the present invention, eight processing engines 222-1–222-n may access either DRAM unit 242 or SRAM unit 244 based on characteristics of the data. Thus, low latency, low bandwidth data may be stored in and fetched from SRAM unit 244, whereas higher bandwidth data for which latency is not as important, may be stored in and fetched from DRAM unit 242. Processing engines 222-1–222-n may execute memory reference instructions to either DRAM controller 224 or SRAM controller 226.

In accordance with an embodiment of the present invention, the hardware-based multithreaded processor 220 also may include a core processor 232 for loading microcode control for other resources of the hardware-based multithreaded processor 220. Core processor 232 may be coupled by a DRAM push and pull bus 234 to DRAM controller 224. Core processor 232 may be coupled by a SRAM push and pull bus 236 to SRAM controller 226.

The core processor 232 may perform general purpose computer type functions such as handling protocols, exceptions, and extra support for packet processing where processing engines 222-1–222-n may pass the packets off for more detailed processing such as in boundary conditions. Core processor 232 may have an operating system (OS) (not shown). Through the OS, core processor 232 may call functions to operate on processing engines 222-1–222-n. Core processor 232 may use any supported OS, such as, a real time OS. In an embodiment of the present invention, core processor 232 may be implemented as an XScale™ based architecture by Intel Corporation of Santa Clara, Calif., using, for example, operating systems such as VXWorks from Wind River International of Alameda, Calif.; µC/OS, from Micrium, Inc. of Weston, Fla. and/or a freeware OS available over the Internet.

Advantages of hardware multithreading may be explained in relation to SRAM or DRAM accesses. As an example, an SRAM access requested by a context (that is, a thread, from one of processing engines 222-1–222-n may cause SRAM controller 226 to initiate an access to SRAM unit 244. SRAM controller 226 may access SRAM memory unit 226, fetch the data from SRAM unit 226, and return data to the requesting processing engine 222-1–222-n.

During an SRAM access, if one of processing engines 222-1–222-n had only a single thread that could operate, that one processing engine would be dormant until data was returned from the SRAM unit 244.

By employing hardware context swapping within each of processing engines 222-1–222-n the hardware context swapping may enable other contexts with unique program counters to execute in that same processing engine. Thus, a second thread may function while the first may await the read data to return. During execution, the second thread accesses DRAM unit 242. In general, while the second thread may operate on DRAM unit 242, and the first thread may operate on SRAM unit 244, a third thread, may also operate in a third of processing engines 222-1–222-n. The third thread operate for a certain amount of time until it needs to access memory or perform some other long latency operation, such as making an access to a bus interface. Therefore, processor 220 may have simultaneously executing bus, SRAM and DRAM operations that are all being completed or operated upon by one of processing engines 222-1–222-n and have one more thread available to process more work.

The hardware context swapping may also synchronize completion of tasks. For example, if two threads hit a shared memory resource, for example, SRAM memory unit 244, each one of the separate functional units, for example, SRAM controller 226 and DRAM controller 224, may report back a flag signaling completion of an operation upon completion of a requested task from one of the processing engine thread or contexts. Once the processing engine executing the requesting thread receives the flag, the processing engine 222 may determine which thread to turn on.

In an embodiment of the present invention, the hardware-based multithreaded processor 220 may be used as a network processor. As a network processor, hardware-based multithreaded processor 220 may interface to network devices such as a Media Access Control (MAC) device, for example, a 10/100BaseT Octal MAC or a Gigabit Ethernet device (not shown). In general, as a network processor, hardware-based multithreaded processor 220 may interface to any type of communication device or interface that receives or sends a large amount of data. Similarly, computer processor system 210 may function in a networking application to receive network packets and process those packets in a parallel manner.

Figure 3:
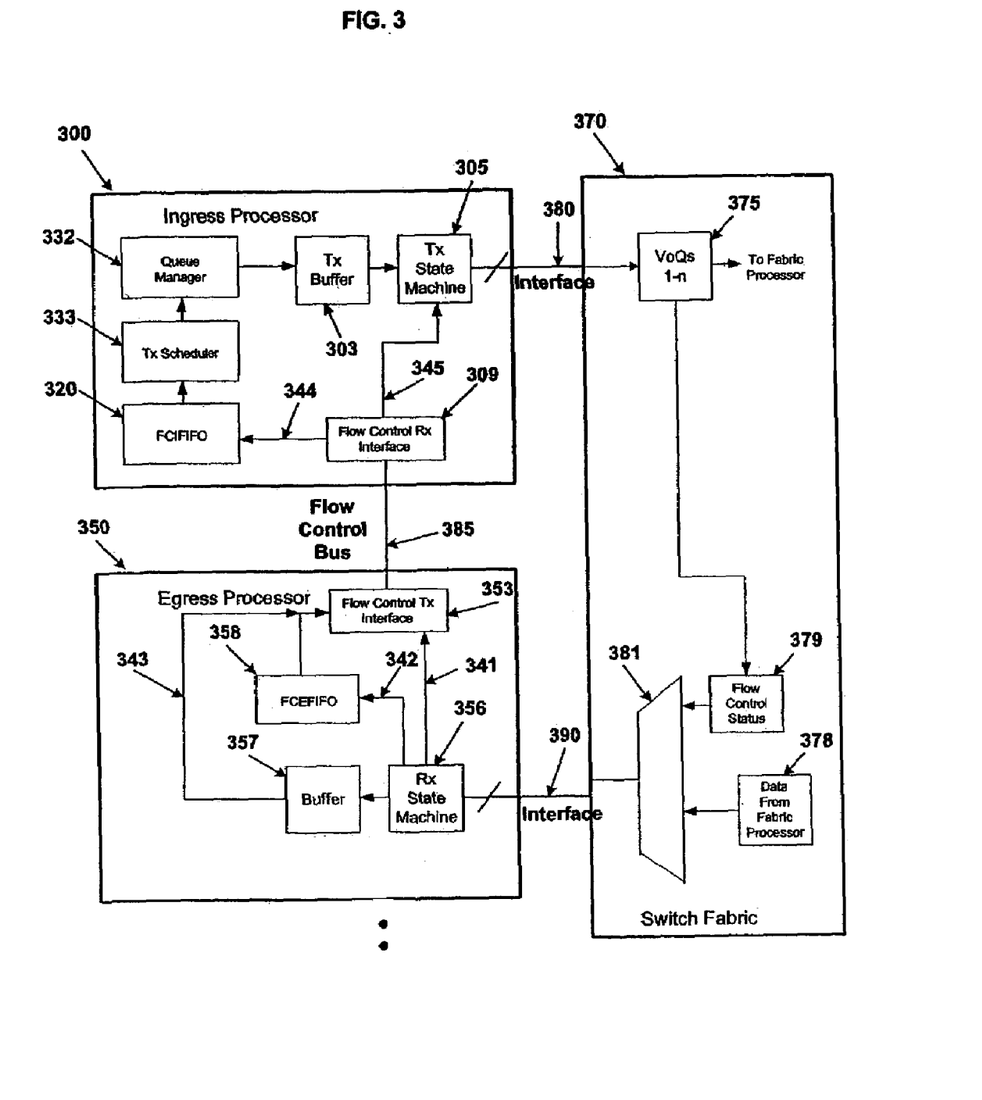
FIG. 3 is a detailed diagram of the network processing system in accordance with an embodiment of the present invention.

FIG. 3 is a functional block diagram of the network processing system as shown in FIG. 1, in accordance with an embodiment of the present invention. Ingress processor 300 and/or egress processor 350, may be embodied as the network processing system 200, shown in FIG. 2.

As shown FIG. 3, ingress processor 300 and egress processor 350 may be coupled to the switch fabric 370 via unidirectional communication paths or interfaces 380 and 390, respectively. In embodiments of the present invention, communication paths 380 and 390 may use CSIX or other protocol for communications. CSIX interfaces are commonly used for switch fabric interfaces.

A unit of information transferred via the CSIX interface is commonly referred to as a C-Frame. Data, control and idle are three common C-Frame categories. Data flow control is provided through the control category. Idle C-Frames received from the switch fabric 370 are automatically discarded and automatically transmitted to the switch fabric 370 when there is no data and/or control information to transfer. Data and control C-Frames may be stored in buffers during transmit and receive operations. The buffers may be partitioned according to C-Frame category so the control and/or data C-Frames can be queued out separately.

Two types of CSIX-L1 (Common Switch Interface, L1) flow control are known as link level flow control and virtual output queues (VoQ) flow control. Every C-Frame base header may contain a ready field containing, which contains two link level flow control bits (e.g., ready bits). These link level ready bits may indicate whether transmitter is clear to send data to the receiver. These ready bits may include one bit for control traffic and one bit for data traffic. The processors 300, 350 may manage link level flow control to prevent the data flow at the link level from the transmitter to the receiver. It is recognized that the transmitter may be one of the processors 300 or 350, while the receiver may be the switch fabric 370, or vice versa. In one example, if a ready bit is cleared (e.g., ready bit=0) in the link level flow control data from the switch 370, the ingress processor 300 may temporary suspend data transfer at the link level over interface 380. Data transfer by ingress processor 300 over interface 380 may continue once the ready bit is set (e.g., ready bit=1).

In embodiments of the present invention, virtual output queue flow control may be carried in flow control C-Frames. Flow control C-Frames may be placed in internal flow control buffers before they are passed to processing engines 222 for processing. VoQ flow control may be provided by VoQ control bits that may indicate the status of a particular queue in the receiver. An Xon/Xoff bit indicating whether the transmitter can send data to a particular VoQ in the receiver may provide this status. It is recognized that VoQs may be located at one of the processors 300, 350, and/or switch fabric 370. In one example, if a VoQ status bit is set (e.g., Xon/Xoff bit=1) in the VoQ flow control data received from the switch 370, the ingress processor 300 may temporary suspend data transfer to the particular VoQ at the switch fabric 370 over interface 380. Data transfer by ingress processor 300 to the VoQ may continue once the VoQ bit is cleared (e.g., Xon/Xoff bit=0).

In embodiments of the present invention, egress processor 350 may include an Rx state machine 356 coupled to the switch fabric 370 via the interface 390. The interface 390 may be coupled to buffer 357 in the egress processor 350. Buffer 357 may include a plurality of VoQs to receive data from switch fabric 370. Rx state machine 356 may divert flow control data received from the switch fabric 370 to flow control egress first in first out (FCEFIFO) buffer 358 and/or directly to flow control transmit (Tx) interface 353.

In embodiments of the present invention, VoQ flow control data may be diverted to the FCEFIFO 358 via, for example, paths 342 and/or 343, while link level flow control data may be diverted to the flow control transmit interface 353 via, for example, paths 341 and/or 343. The FCEFIFO 358 may store the VoQ flow control before sending it to the flow control transmit interface 353. Flow control transmit interface 353 may send flow control data to the ingress processor 300 over flow control bus 385. Alternatively, VoQ flow control data may be sent directly to the flow control transmit interface 353 for transmission to the ingress processor 300.

It is recognized that the functionality of the flow controller 360 and/or other processing intelligence in the egress switch 350 may be provided by one or more of the processing engines 222 shown in FIG. 2, and/or other software, hardware and/or combination thereof. It is recognized the functionality of the block components and/or data flow and/or path as described herein are given as examples only and alternative functionality and/or data flow may be provided by different components and/or data paths or interfaces.

In embodiments of the present invention, the ingress processor 300 may include flow control receive (Rx) interface 309 coupled to the flow control bus 385. The flow control receive interface 309 may receive flow control data from egress processor 350 via flow control bus 385. VoQ flow control data may be sent to the flow control ingress first in first out (FCIFIFO) buffer 320 via path 344 for storage. Link level flow control data may be sent to the Tx state machine 305 via path 345. Based on the VoQ flow control data from the FCIFIFO 320, the Tx scheduler 333 and/or queue manager 332 may control and schedule transfer of data stored in the Tx buffer 303. It is recognized that the Tx scheduler 333 may schedule queues for data transfer, while the queue manager 332 may determine which queues need scheduling. The Tx state machine 305 may send the stored data to the VoQs 1–n 375 located in the switch fabric 370 over interface 380.

In embodiments of the present invention, switch fabric 370 may send switch fabric flow control status data 379 and payload data 378 to the egress processor 350 via interface 390. Flow control status 379 and data 378 may be multiplexed into a single C-Frame using multiplexer 381 and transmitted over the interface 390. Thus, flow control data 379 is sent using in-band signaling over the unidirectional interface 390.

Figure 4:
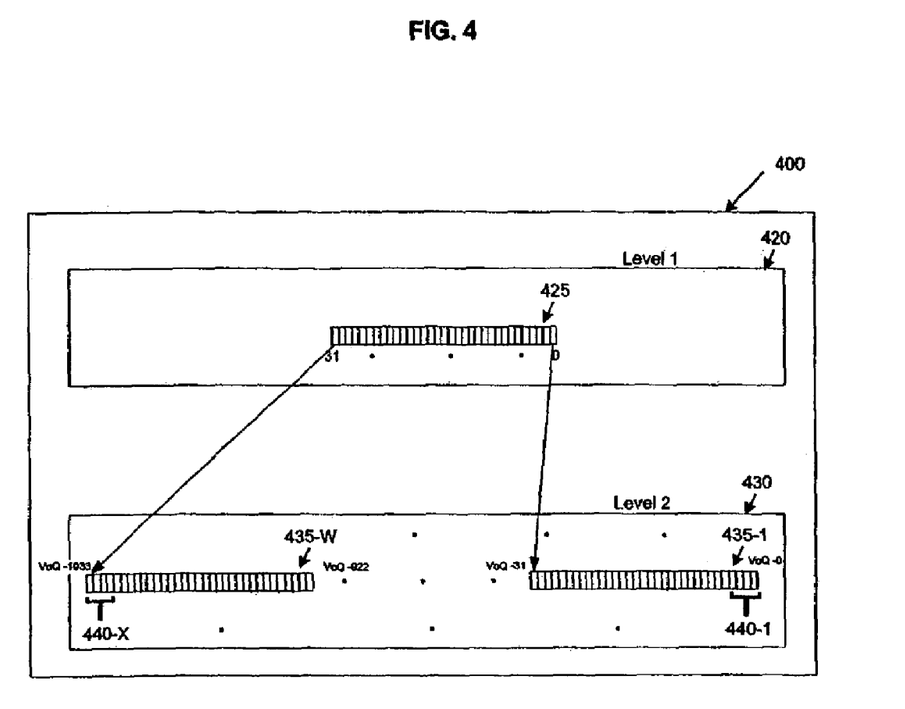
FIG. 4 illustrates a bit vector table in accordance with an embodiment of the present invention.

In embodiments of the present invention, flow control data may include VoQ flow control data and/or link level flow control data. VoQ flow control data may indicate whether one or more of the virtual output queues 1–n (VoQ) in buffer 375 and/or buffer 357 is unable to currently accommodate the data being received from the ingress processor 300 over interface 380. In other words, the flow control data may indicate whether the data from the ingress processors 300 is causing one or more of the VoQs 375-1 to 375-n to become congested. In this case, an overflow message indicating that a VoQ buffer threshold has been exceeded may be included in the flow control status data 379. In embodiments of the present invention, the flow control data 379 may include Xon/Xoff bit for each of the VoQs 375-1 to 375-n and/or VoQs in buffer 357 as shown in FIG. 4.

In alternative embodiments of the present invention, flow control data 379 may include link level flow control data to indicate whether data at the link level to buffers 375 and/or 357 should be temporarily suspended. As indicated above, link level ready bits from the switch fabric 370 may cause the Tx state machine 305 to temporarily suspend data transfer over the entire link to the buffer 375. Link level ready bits originating from egress processor 350 may cause the switch fabric to temporarily suspend data transfer over the entire link to the buffer 357.

In embodiments of the present invention, a Xoff bit may indicate that the associated VoQ of VoQs 1–n 375 and/or buffer 357 is congested and is unable to handle additional data at the current rate. In response, the ingress processor 300 may either discontinue transmitting for that VoQ and/or may adjust the rate at which data is being transmitted to the identified VoQ 375. Alternatively, a Xon bit may indicate that the associated VoQ of VoQs 1–n 375 and/or buffer 357 can receive data at the current rate from the ingress processor 300.

In embodiments of the present invention, C-Frames packets from the switch fabric 370 may be received at the Rx state machine 356 at the egress processor 350. As indicated above, the Rx state machine 356 may divert flow control data. VoQ flow control data may be passed to the FCEFIFO 358 via 342. Link level flow control data may be passed to the flow control transmit interface 353. The C-Frame payload data may be sent to the buffer 357 for storage and/or for processing by processing engines 222.

In alternative embodiments of the present invention, link level and/or VoQ flow control data may be generated from buffer 357 and sent to flow control transmit interface 353. The VoQ flow control data from buffer 357 may indicate if one or more VoQ in buffer is congested and requires temporary suspension of data transfer for that VoQ from switch fabric 370. The link level flow control data from buffer 357 may indicate whether the entire buffer 357 is congested and requires temporary suspension of data over the entire link.

In embodiments of the present invention, the flow control transmit interface 353 may transmit the flow control data to the ingress processor 300 over the flow control bus 385. The flow control bus 385 may be a private high-speed flow control bus. The flow control data 379 may be transferred across the flow control bus 385 in a cut-through manner. In other words, parts of the flow control data 379 may be transmitted over to the ingress processor 300 before the entire C-Frame is received at the egress processor 350. Error checking, at the egress switch 350, may be performed when the entire C-Frame data is received and in the event of a detected error, the affected data may be discarded at, for example, the ingress processor.

In alternative embodiments of the present invention, the flow control data may not be transmitted to the ingress processor 300 until the entire C-Frame is received at the egress processor 350. In this case, appropriate error checking may be performed on the entire C-Frame at the egress processor 350 prior to transmission. If the C-Frame is determined to be error-free, the entire C-Frame may be transferred across the flow control bus 385 to the ingress processor 300.

In embodiments of the present invention, the flow control data may be received at the flow control receive interface 309 over the flow control bus 385. The VoQ flow control data may be forwarded FCIFIFO buffer 320 for temporary storage. If a valid flow control information is present in the FCIFIFO 320, a FCIFIFO non-empty bit may be set. This bit may be provided to each of the processing engines 222-1 to 222-n and can be tested using a branch instruction. Based on the non-empty FCFIFO bit being set, the Tx scheduler 333 may issue a block read from the FCFIFO to amortize the read latency for flow control data related to a plurality of VoQs 375. Link level flow control data may be sent directly to the Tx state machine 305 via path 345.

In embodiments of the present invention, the Tx scheduler 333 may process the VoQ flow control data to determine the flow control state for VoQs in the fabric 370. Processing the flow control data may involve decoding the Xon and Xoff messages for the corresponding VOQ and maintaining a bit vector to indicate the flow control state for that queue. Each bit in the bit vector may be associated with or represent the flow status of one of the VoQs 375.

Advantageously, the Tx scheduler 333 may process up to two fabric flow control messages in a single beat (e.g., arrival time of a minimum-sized data packet). One flow control message may be derived from the C-Frame transmitted by the ingress processor 300 to the switch fabric 370. The other flow control message may be derived from the C-Frame transmitted by the switch fabric 370 to the egress processor 350. For example, the C-Frame transmitted from the ingress processor 300 to the fabric 370 may trigger a predetermined overflow threshold for that particular VoQ causing an Xoff message. In other words, the C-Frame may cause the VoQ to which the C-Frame is directed to overflow or become congested. At the same time, the C-Frame that is being transmitted from the fabric 370 to the egress processor 350 may push that particular VoQ size below the overflow threshold resulting in a Xon message. In other words, the draining of a C-Frame from the VoQ in the switch fabric 370 may permit the VoQ to continue to receive additional data. Accordingly, the Tx scheduler may process two flow control messages to maintain line rate performance, in accordance with embodiments of the present invention.

As indicated above, the flow control data may include an Xoff message that may indicate which queues 375 are in a congested condition. Accordingly, the Tx scheduler 333 may suspend data transmission to the congested queues. Data transmission to the queues may resume once the condition is cleared. In embodiments of the present invention, the flow control status of the VoQs 375 may be mapped into a VoQ bit vector table that may be stored in a general purpose register (GPR) in the local memory of one of the processing engines 222. Alternatively, the bit vector table may be stored in SRAM 244, DRAM 242, and/or other memory location. The size of the VoQ bit vector table may depend on the number of VoQs supported by the switch fabric 370 and/or other factors.

FIG. 4 shows an example of a hierarchical bit vector table 400 including flow control data in accordance with embodiments of the present invention. In this example, the bit vector table 400 may be a flow control bit vector table that may support up to 1024 queues using several hierarchical levels. In the example of FIG. 4, the bit vector table 400 may include a first level 420 and a second level 430. The first level may include a single 32-bit register that may be stored in 4 bytes of memory. In this example, LEVEL 1 bit 0 may specify VoQs 0 to 31, bit n may specify VoQs (n×32) to (n×32+31) and bit 31 may specify VoQs 922 to 1023. Each bit in the first level 420 may be mapped to a second level 430, as sown. In other words, each bit in vector 425 may specify one of the 32 VoQs in the sub-group 435-1 to 435-W, where W in this case may be 32 sub-groups. For example, bit 0 in bit vector 425 may correspond to subgroup 435-1 and bit 31 in bit vector 425 may correspond to sub-group 435-W.

In embodiments of the present invention, each bit in sub-group 435 may correspond to a single VoQ in the switch fabric 375. Each set of 4 bits may correspond to a physical port in the switch fabric. In this example, the first set of four bits 440-1 may correspond to physical port 0 while bit set 440-X may correspond to physical port X. In this case the switch fabric may contain a total of 64 physical ports thus, X in this case may be 64. The second level data may include, for example, thirty-two 32-bit registers that may be stored in 128 bytes of memory.

In embodiments of the present invention, if one of the bits in the bit vector 425 is set (e.g., the bit=1), this may indicate that the corresponding sub-group 435 in the second level 430 may contain a VoQ that is congested and data transmission to that VoQ should be temporarily suspended by the ingress processor 300. In this case, the Tx scheduler 333 may need to examine the corresponding sub-group 435 to determine which VoQ of the 1024 queues in this example is in this congested condition. For example, one of the queues in the corresponding sub-group 435 may have a its bit set to 1 (e.g., an Xoff condition) indicating that data transmission to that queue should be temporarily suspended.

On the other hand, if a bit in the bit vector 425 is not set or is cleared (e.g., the bit=0), this may indicate that none of the queues represented in by the corresponding sub-group 435 in the second level 430 contains a VoQ that is congested condition. In this case, the Tx scheduler 333 does not need to examine the corresponding sub-group 435. Transmission to these queues may continue normally. Thus, each bit in the corresponding sub-group 435 may have its bit set to 0 indicating an Xon condition for normal transmission to the queue. It is recognized that the bit vector table of FIG. 4 and the corresponding description above is given by way of example only and should not be construed as limiting. In accordance with embodiments of the present invention, one of ordinary skill in the art can construct a variety of different vector tables that contain flow control data for the VoQs in the fabric 370.

In embodiments of the present invention, the Tx scheduler 333 may identify the queues in the congested condition based on the flow control data from the vector table 400. The Tx scheduler 333 may monitor a transmit queue to determine which queues in the ingress processor 300 have data to send to the switch fabric 370. In the event the queue manager 332 observes the transmit queue change states (e.g., go from empty to non-empty state or from non-empty to empty state), the queue manager 332 may post a transmit state message to the Tx scheduler 333 via a ring.

In embodiments of the present invention, the Tx scheduler may read any new transmit state messages and update a transmit queue state bit vector table. The transmit queue state bit vector table may be similar to the flow control bit vector table 400. However, each entry in the transmit vector table may identify which queues have data to be transmitted to the switch fabric 370. For example, if a bit in bit vector 425 is set (e.g., to 1), this may indicate that the VoQs represented in the corresponding subgroup 435-1 to 435-W may have data to send to the switch fabric 370.

In embodiments of the present invention, the queue manager 332 may process two queue transition messages (i.e., change of state) in one minimum size packet arrival time. Since the queue manager may perform one enqueue and one dequeue operation per beat, each of these operations could yield change of state in the queue. In other words, each enqueue and dequeue operation may cause a queue to transition from empty to non-empty state and from non-empty to empty state.

It is recognized that the functionality of the Tx scheduler 333, queue manager 332 and/or other processing intelligence in the ingress switch 300 may be provided by one or more of the processing engines 222.

In embodiments of the present invention, the Tx scheduler 333 may further maintain transmit pipeline depth control to ensure a timely response to the switch fabric 370 flow control messages and to ensure that the ingress traffic does not overflow the VoQ buffers in the fabric. The TX Scheduler 333 may limit the number of transmit requests in the transmit pipeline at any given time. The Tx scheduler 333 may use a simple transmit counter to keep track of the number of transmit requests issued. The ingress processor 300 may maintain, for example, an 8-bit wrapping counter that counts up each time an entire C-Frame or TBuf element is transmitted out of the processor 300.

Periodically or during each schedule loop, the Tx scheduler thread may read the contents of the counter to get the current value of the number of C-Frames transmitted. By subtracting the scheduled C-Frames—transmitted C-Frames provides the number of Tx requests in the transmit pipeline. The Tx scheduler 333 may attempt to keep the number of Tx requests in the pipeline to a predetermined threshold value. This value may be computed based on the assumptions of buffering on the fabric device, the round-trip flow control message latency, number of queues, etc.

In embodiments of the present invention, the Tx scheduler may use the flow control data, the transmit queue state and the transmit pipeline state to schedule transmit requests. The Tx scheduler 333 data pipe-stages may segment the data transmitted to the switch fabric 300 into C-Frames. It is recognized that switch manufacturers may specify C-Frame size. As known, CSIX-L1 protocol specifies a max C-Frame size of 256 bytes. It is recognized that C-Frame sizes such as 64 bytes or 128 bytes may be used in embodiments of the present invention. The Transmit Scheduler 333 may generate a separate transmit request for each C-Frame.

In embodiments of the present invention, a transmit buffer 303 may store data to be transmitted across the interface 380 using, for example, the CSIX protocol. The Tx state machine 305 may compile the C-Frames to be transmitted over the interface 380, according to the appropriate scheduling algorithm.

In embodiments of the present invention, the transmit scheduler 333 may use a round robin algorithm among, for example, the 1024 queues to select a queue to service. Alternatively, the scheduler 333 may use a weighted round robin scheduling algorithm, a deficit round robin scheduling algorithm or any other type of scheduling algorithm. The Tx scheduler may use the hierarchical bit vector table 400 to perform a efficient non-linear bit vector search to determine the flow control status for each queue and/or the transmit queue status. For example, if a bit in the first level vector is not set, the corresponding second level sub-group vectors need not be traversed.

To further improve the efficiency, the Tx scheduler 333 may generate a master vector table, which may be obtained by the logical AND operation of the VOQ flow control vector and the transmit queue state vector, in accordance with embodiments of the present invention. A bit set in the resulting master vector may indicate that the corresponding queue has data to transmit and the flow control state is set to Xon. Accordingly, the Tx scheduler 333 may use this single master vector to schedule data transmission to the switch fabric 370. For example, during each schedule loop, the Tx scheduler 333 may first determine if the total Tx pipeline meets the specified threshold requirements.

If the Tx pipeline meets the threshold requirements, the Tx scheduler 333 thread may pick up from where the last schedule decision was made and scans the master vector table to find the next bit set. Based on this information, the Tx scheduler 333 may determine the data element or C-Frame that may be scheduled for transmission. Once the schedule decision is made, the Tx scheduler 333 may issue a dequeue request to the queue manager 332 to dequeue the head of the selected VoQ. The queue manager 332 may process the dequeue request, perform the dequeue operation and/or pass the buffer descriptor of the dequeued cell to the transmitting processing engine 222 to transmit the C-Frame out of the ingress processor 300.

In an alternative embodiment of the present invention, the data flow control method described above may be applied in the case where the VoQs in the buffer 357, in the egress processor 350, overflow due to congestion. In this case, the buffer 357 may send VoQ flow control data indicating the status of the VoQs to flow control Tx interface 353 via path 343. The VoQ flow control data from buffer 357 may be sent to the ingress processor 300 via flow control bus 385. The VoQ flow control data may be stored in FCIFIFO 320 and/or may be sent directly to flow control transmit interface 353. The VoQ flow control data sent to the ingress processor and may be included as in-band signals that are sent to the switch fabric 370 in the C-Frames over interface 380.

In embodiments of the present invention, the switch fabric processor and/or other data traffic controller (not shown) may remove the VoQ flow control data received from the ingress processor 300. The switch fabric 370 may use the VoQ flow control data to identify VoQs in buffer 357 that are congested and in response, may suspend transmission of data to those VoQs in the buffer 357. Once the congested VoQs are cleared, buffer 357 may send appropriate VoQ flow control data to the switch fabric 370 to resume on those VoQs.

In alternative embodiments of the present invention, switch fabric 370 may send link level flow control data to the egress processor 350 to suspend data traffic on the entire link between the ingress processor 300 and the switch fabric 370. The link may be one or more data channels and/or may be the entire communication interface 380 between the ingress processor 300 and switch fabric 370. In this case, the buffer 375 may indicate an overflow condition that may require that data on the entire link from the ingress processor 300 be temporarily suspended.

In embodiments of the present invention, the buffer 375 may set a ready bit (e.g., ready bit=1) in the link level flow control data included in the flow control status 379. The link level flow control data may be included as in-band signaling in the C-Frames transmitted to the egress processor 350 over interface 390. The Rx state machine may remove the link level flow control data from the C-Frames and divert them to the flow control transmit interface 353 over path 341. The link level flow control data may be sent to the flow control receive interface 309 over flow control bus 385. The link level flow control data may be sent to the transmit state machine 305 over path 345. If, for example, the ready bit is set, the transmit state machine 305 may suspend data traffic over the entire link to switch fabric 370.

Once the buffer 375 overflow condition is cleared, the switch fabric 370 may clear the ready bit included in the link-level flow control data. The link level flow control data may be sent to the transmit state machine 305 from the egress processor 350. In response to the cleared ready bit, the transmit state machine may resume data traffic over the entire link to switch fabric 370.

In further alternative embodiments of the present invention, if data buffer 357 reaches a buffer full condition, link level flow control data including a set ready bit may be passed to the flow control transmit interface 353 via path 343. The link level flow control data may be transmitted to the Tx state machine 305 via the flow control bus 385 and path 345. The link level flow control data may be transmitted to the switch fabric 370 as in-band signals in the C-Frames being sent over interface 380. In response to the set ready bit, the switch fabric may temporarily suspend data traffic to the egress processor 350 over the link 390. Once the data overflow condition is cleared, the ready bit in the link level flow control data may be cleared. In response, the switch fabric 370 may resume data traffic to the egress processor 350.

Figure 5:
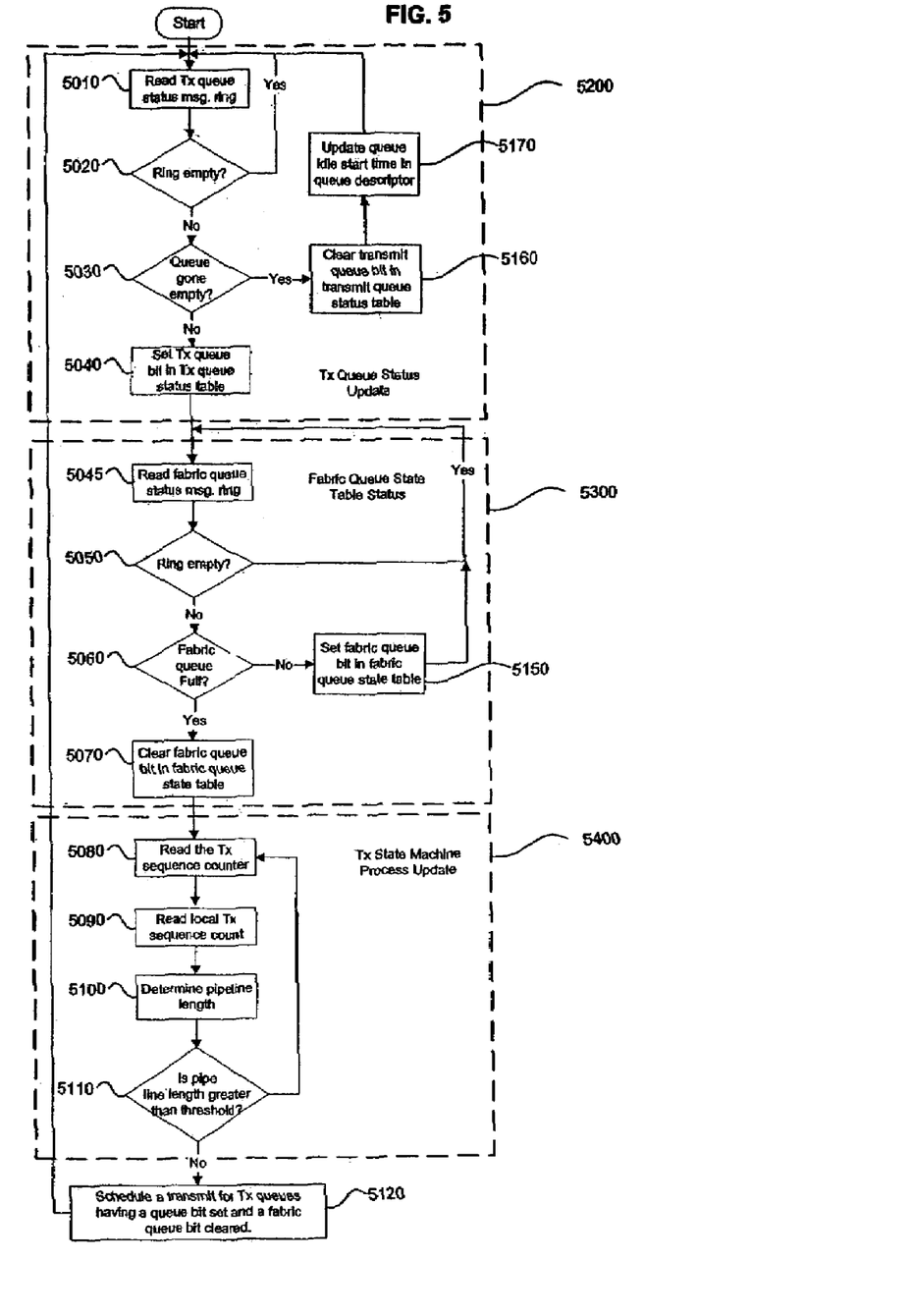
FIG. 5 is a flow chart in accordance with an embodiment of the present invention.

FIG. 5 is a flow chart in accordance with an embodiment of the present invention. FIG. 5 relates to scheduling tasks that may be performed at the ingress processor 300 and/or egress processor 350. The transmit (Tx) queue status message ring is read, as shown in 5010. As shown in 5020, if the message ring is empty, message ring may be read again later. If the message ring as a status change from a non-empty to an empty condition, the transmit queue bit in the transmit queue status table may be cleared, as shown in 5030–5160. In this case, the queue idle start time in the queue descriptor is updated and the message ring may be read again later, as shown in 5170 and 5010.

In embodiments of the present invention, if the message is not empty, the Tx queue bit in the Tx queue status table may be set, as shown in 5030–5040. In accordance with embodiments of the present invention, box 5200 may determine which queues in the transmit queue of the ingress processor 300, for example, have data to send to the switch fabric 370.

As shown in 5045–5050, the fabric queue status message ring may be read to determine whether the ring is empty. The fabric queue may be one of the plurality of VoQs 375 in the switch fabric 370. If the ring is empty, the fabric queue status message ring may be re-read, as shown in 5050 and 5045. If a fabric queue is determined to be full, the fabric queue bit associated with the queue fabric may be cleared in a fabric queue state table, as shown in 5060–5070. A cleared bit may indicate that data may be sent to the corresponding fabric queue. If, on the other hand, a fabric queue is determined to be full, the associated fabric queue bit may be set in the fabric queue state table, as shown in 5060 and 5150. This may indicate that data to the queues identified to be full should be suspended until the fabric queue can accept additional data. In accordance with embodiments of the present invention, box 5300 may determine which VoQs 375 in the switch fabric 370 can accept data and which VoQs 375 are full.

In embodiments of the present invention, a value of the Tx sequence counter may be read, as shown in 5080. The Tx counter may count the number of packets that have been transmitted by the ingress processor 300. As shown in 5090, a local transmit sequence count may be read. The local transmit sequence count may indicate the number of data frames that are scheduled for transmission. By subtracting the local transmit sequence count from the value of the Tx sequence counter, a pipeline length may be determined, as shown in 5100. The pipeline length may be compared to a predetermined pipeline threshold value. If the determined pipeline length is less than or equal to the pre-determined threshold value, a data transmits for transmit queues having a transmit queue bit set and fabric bit cleared may be scheduled, as shown in 5110–5120. The process may be re-started, as shown in 5120 and 5010. If, on the other hand, the determined pipeline length is greater than or equal to the predetermined threshold value, the value of the Tx sequence counter may be read again and the process re-started, as shown in 5110–5080.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A data flow-control method comprising:
    examining a plurality of transmit queues to determine which queues have data to transmit; setting a transmit queue bit in a transmit queue status table for each queue having data;
    examining flow control data corresponding to a plurality fabric queues to determine which fabric queues have a buffer full condition; clearing a fabric queue bit in a fabric queue state table for each fabric queue determined not to have the buffer full condition; determining if a pipeline length exceeds a predetermined threshold;
    if the pipeline length does not exceed the predetermined threshold, scheduling a data frame transmit for queues that have the transmit queue bit set and the fabric queue bit cleared.

2. The data flow control method of claim 1, further comprising:
    analyzing a transmit queue status message ring for a status change; and
    if the transmit queue status message ring changes status from empty to nonempty, setting the transmit queue bit in the transmit queue status table.

3. The data flow control method of claim 2, further comprising:
    if the transmit queue status message ring has an empty status, clearing the transmit queue bit in the transmit queue status table.

4. The data flow control method for claim 1, further comprising:
    analyzing a fabric queue status message ring to determine which fabric queues have the buffer full condition.

5. The data flow control method of claim 4, further comprising:
    setting the fabric queue bit in the fabric queue state table for each fabric queue determined to have the buffer full condition.

6. The data flow control method of claim 1, further comprising:
    counting a number of data frames that have been transmitted.

7. The data flow control method of claim 6, further comprising:
    determining a number of data frames scheduled for transmission.

8. The data flow control method of claim 7, further comprising:
    deducting the number of data frames scheduled for transmission from the counted data frames to determine the pipeline length.

* * * * *